No. 734,495. PATENTED JULY 28. 1903.
E. B. ALLEN.
BUTTONHOLE CUTTING AND STITCHING MACHINE.
APPLICATION FILED MAY 8, 1902.
NO MODEL.
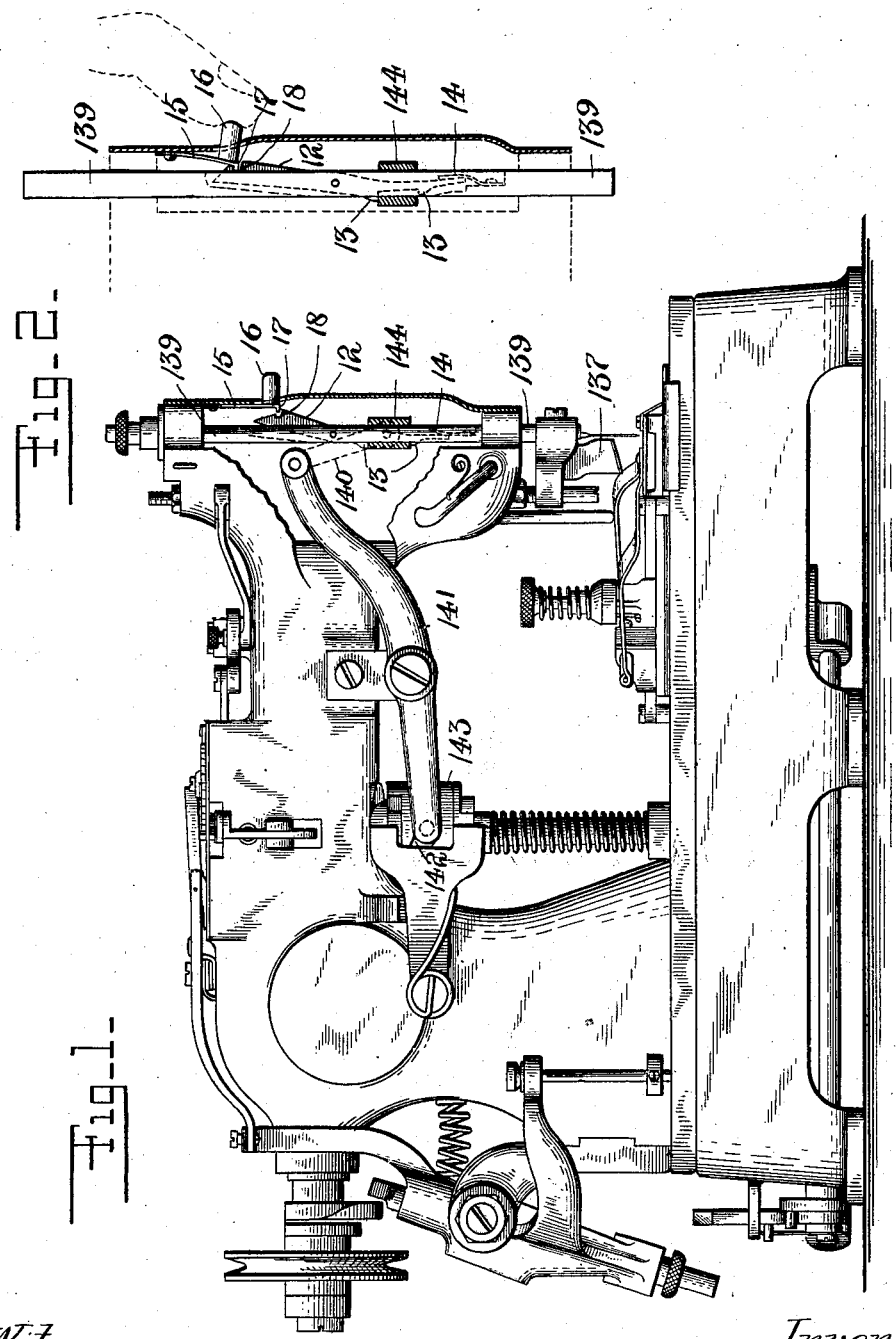
Witnesses:
Inventor:
Edward B. Allen No. 734,495. Patented July 28, 1903.

UNITED STATES PATENT OFFICE.

EDWARD B. ALLEN, OF ELIZABETH, NEW JERSEY, ASSIGNOR TO THE SINGER MANUFACTURING COMPANY, A CORPORATION OF NEW JERSEY.

BUTTONHOLE CUTTING AND STITCHING MACHINE.

SPECIFICATION forming part of Letters Patent No. 734,495, dated July 28, 1903.

Application filed May 8, 1902. Serial No. 106,451. (No model.)

*To all whom it may concern:*

Be it known that I, EDWARD B. ALLEN, a citizen of the United States, residing at Elizabeth, in the county of Union and State of New Jersey, have invented certain new and useful Improvements in Buttonhole Cutting and Stitching Machines, of which the following is a specification, reference being had therein to the accompanying drawings.

In stitching buttonholes on automatic buttonhole-machines one of the stitching-threads sometimes breaks or gives out before a buttonhole is completed, and in such case it is necessary in order to make a nice buttonhole to unravel or pick out the stitches which have been made and then restitch the entire buttonhole. Most buttonhole-machines are now provided with automatic cutters which cut the buttonholes either before or after the stitching operation, and the automatic operation of the cutter as these machines are usually organized must necessarily occur at each cycle of operations necessary for making each complete buttonhole, and in restitching a buttonhole the additional unnecessary cutting stroke of the cutter is objectionable, and particularly so in machines in which the buttonholes are cut after being stitched, for the reason that as the buttonholes are not spread for the stitching operations in these machines it is difficult, if not impossible, to make a nice buttonhole after the work is cut. Also in machines in which the buttonholes are cut before being stitched a second operation of the cutter is more or less objectionable, as the second cut may not register exactly with the first cut.

This invention has for its object to avoid the objections arising from an unnecessary stroke of an automatic cutter of a buttonhole-stitching machine by providing means whereby the attendant may manually temporarily disconnect the automatically-operated buttonhole-cutter from its actuating mechanism when desired, either while the machine is running or when it is at rest.

In the accompanying drawings, Figure 1 is a side view, partly broken out, of an automatic buttonhole-machine embodying the invention; and Fig. 2 is a detail view showing the cutter-bar uncoupled from its operating device.

The buttonhole-machine herein shown is essentially the same in its general construction and operation as the machine fully shown and described in my United States application filed September 16, 1901, Serial No. 75,667. The said machine comprises a vertically-movable cutter-bar 139, mounted in the head of the machine and with which the buttonhole-cutter 137 is suitably connected, said cutter-bar being in the said machine operated to perform its cutting stroke at the completion of a buttonhole from a cam-groove 142 in a cam-cylinder 143 through a lever 141, connected by a link 140 to a collar 144, encircling the said cutter-bar. In the present instance the cutter-bar is slotted or recessed for the reception of a coupling-lever 12, pivoted to the said cutter-bar, and the lower arm of which lever is forked or provided with jaws 13, embracing the collar 144, said lever being normally held in the coupled position (shown in Fig. 1) by a spring 14, housed within the said cutter-bar and bearing against said lower arm of said lever. To the inside of the face-plate is attached a spring 15, provided at or near its free lower end with a push-button 16 and with an inwardly-projecting lip 17, registering with a notch 18, formed near the upper end of the coupling-lever 12, so that by pressing in the said push-button the attendant can force the said coupling-lever to the position shown in Fig. 2, so as to move the lowermost jaw 13 within the cutter-bar, thereby uncoupling said collar 144 from said bar in such a manner as to permit said collar to move downward from the position shown in Fig. 2 without moving the cutter-bar downward.

The operation of the invention is as follows: Should one of the stitching-threads break or give out while a buttonhole is being worked, this fact will be immediately apparent to an observing attendant, who instead of stopping the machine immediately will preferably let it run to the end of a buttonhole working and cutting operation, when it will be stopped by the automatic stop-motion device with the parts in position for the commencement of the next buttonhole. Such continued running of the machine would, however, normally include an automatic cutting stroke of the buttonhole-cutter, which in the case of a non-formation of stitches, owing to a broken or exhausted thread, would be objectionable. To prevent such cutting stroke, the attendant presses in the push-button 16 and holds the same pushed in until the machine is automatically stopped, and thus when the cutter-operating lever 141 is given its stroke by its actuating-cam it operates idly, owing to the fact that it is disconnected from the cutter-bar. When the collar 144 is uncoupled from the cutter-bar 139, said bar is held up by the lip 17 entering the notch 18 in the lever 12 while the attendant holds the parts uncoupled, and when the attendant releases the said push-button the springs 14 and 15 restore the parts to their normal positions.

The mechanism for actuating the cutter-operating cam at proper intervals in the buttonhole-stitching operations is fully shown and described in my application Serial No. 75,667, hereinbefore referred to, and as said mechanism forms no part of the present invention it need not be herein further mentioned. The present invention is not, however, to be understood as being limited to any particular style of automatic buttonhole cutting and stitching machine or to the details herein shown and described, as the details of the invention may obviously be varied widely without departing from the spirit or essence thereof.

Having thus described my invention, I claim and desire to secure by Letters Patent—

1. In a buttonhole cutting and stitching machine, the combination with an automatic buttonhole-cutter, of a coupling device normally connecting said cutter with its operating mechanism, and means, controlled by the attendant, whereby the said cutter may be disconnected from its operating mechanism either when the machine is running or when it is at rest.

2. In a buttonhole cutting and stitching machine, the combination with an automatic buttonhole-cutter, of a spring-held coupling device normally connecting said cutter with its operating mechanism, and uncoupling means, controlled by the attendant, whereby the said spring-held coupling device may be forced to a position to disconnect the said cutter from its operating mechanism, when desired.

3. In a buttonhole cutting and stitching machine, the combination with an automatic buttonhole-cutting mechanism comprising a cutter-bar, of a coupling device mounted on said bar and normally connecting the latter to an operating part, and a manual device controlling said coupling device and by means of which the attendant may disconnect said cutter-bar from its operating mechanism, when desired.

4. In a buttonhole cutting and stitching machine, the combination with an automatic buttonhole-cutting mechanism comprising a cutter-bar, of a spring-held coupling device mounted on said bar and normally connecting the latter to an operating part, and a manual device controlling said coupling device and by means of which the attendant may disconnect said cutter-bar from its operating mechanism, when desired.

5. In a buttonhole cutting and stitching machine, the combination with an automatic buttonhole-cutting mechanism comprising a cutter-bar, of a spring-held coupling device mounted on said bar and normally connecting the latter to an operating part, and a spring-restored manual device controlling said coupling device and by means of which the attendant may disconnect said cutter-bar from its operating mechanism, when desired.

6. In a buttonhole cutting and stitching machine, the combination with a cutter-bar and cutter and their operating mechanism, of a coupling-lever mounted in said cutter-bar and normally connecting said bar to an operating part, and a manual device mounted on a stationary part of the machine and by means of which the attendant can control the said coupling-lever so as to disconnect the said cutter-bar from its operating mechanism when desired.

7. In a buttonhole cutting and stitching machine, the combination with a cutter-bar and cutter and their operating mechanism, of a spring-held coupling-lever mounted in said cutter-bar and normally connecting said bar to an operating part, and a manual device mounted on a stationary part of the machine and by means of which the attendant can control the said coupling-lever so as to disconnect the said cutter-bar from its operating mechanism, when desired.

8. In a buttonhole cutting and stitching machine, the combination with a cutter-bar mounted, for vertical reciprocation, in the head of the machine, a cutter operatively connected with said bar, an operating-cam, a collar encircling said cutter-bar, an actuating-lever operatively connected with said cam and collar, a spring-held coupling-lever mounted in said cutter-bar and having jaws embracing said collar, and a manual device, controlled by the attendant, for moving said coupling-lever to disconnect said jaws from said collar, when desired.

9. In a buttonhole cutting and stitching machine, the combination with a cutter-bar, of a periodically-rotated cam which is normally rotated once during the stitching of each buttonhole, a cutter-lever operated by said cam, means for connecting said lever with the said cutter-bar, said means comprising a spring-held coupling device or lever which is normally in position to complete the connection of the said cutter-lever with said cutter-bar, and a manual device controlling said coupling device and by means of which the attendant may disconnect said cutter-bar from its operating-lever, when desired.

10. In a buttonhole cutting and stitching machine, the combination with a cutter-bar, of a periodically-rotated cam which is normally rotated once during the stitching of each buttonhole, a cutter-lever operated by said cam, means for connecting said lever with the said cutter-bar, said means comprising a spring-held coupling device or lever which is normally in position to complete the connection of the said cutter-lever with said cutter-bar, and a manual device controlling said coupling device and by means of which the attendant may disconnect said cutter-bar from its operating-lever, when desired, said manual device being constructed to serve as a detent to hold the cutter-bar elevated when disconnected from its operating mechanism.

In testimony whereof I affix my signature in presence of two witnesses.

EDWARD B. ALLEN.

Witnesses:
HENRY J. MILLER,
HENRY A. KORNEMANN.